United States Patent [19]

Yasukawa

[11] Patent Number: 5,169,105
[45] Date of Patent: Dec. 8, 1992

[54] APPARATUS AND METHOD FOR SUPPORTING AN ACCESSORY UNIT WITHIN AN AUTOMOBILE CONSOLE

[75] Inventor: Nihiko Yasukawa, Alpharetta, Ga.

[73] Assignees: Oki Electric Industry Co., Ltd., Tokyo, Japan; Oki America, Inc., Hackensack, N.J.

[21] Appl. No.: 831,938

[22] Filed: Feb. 6, 1992

Related U.S. Application Data

[62] Division of Ser. No. 618,641, Nov. 27, 1990.

[51] Int. Cl.$^5$ ............................................. A44B 1/18
[52] U.S. Cl. ............................... 248/205.2; 224/42.45 R
[58] Field of Search .............. 248/27.1, 27.3, 205.2, 248/551, 553, 531.9, 57, 231.9; 455/345; 224/42.45 R; 361/422, 417, 419; 70/58, 57; 312/7.1, 342

[56] References Cited

U.S. PATENT DOCUMENTS

| | | | |
|---|---|---|---|
| 3,052,362 | 9/1962 | Bischoff | 248/231.9 X |
| 3,518,421 | 6/1970 | Cogdill | 248/57 |
| 3,799,483 | 3/1974 | Chiappinelli . | |
| 4,245,872 | 1/1981 | Kakigi | 312/7.1 X |
| 4,524,933 | 6/1985 | Rouws . | |
| 4,557,445 | 12/1985 | O'Hara | 248/27.1 |
| 4,610,054 | 9/1986 | Malian | 24/67 R |
| 4,611,734 | 9/1986 | Luecking et al. | 224/42.42 |
| 4,623,110 | 11/1986 | Kanari . | |
| 4,783,110 | 11/1988 | Beukema et al. | 296/37.7 |
| 4,784,361 | 11/1988 | Kobayashi | 248/551 |
| 4,815,683 | 3/1989 | Ferrante | 248/205.2 |
| 4,848,627 | 7/1989 | Maeda et al. | 224/275 |
| 4,868,715 | 9/1989 | Putman | 361/422 |
| 4,887,338 | 12/1989 | Handler | 248/205.2 X |
| 4,911,389 | 3/1990 | Self | 248/146 |
| 4,941,718 | 7/1990 | Alexander, III et al. | 312/312 |
| 4,947,661 | 8/1990 | Yoshida . | |
| 5,020,151 | 5/1991 | Sampei | 455/345 |

FOREIGN PATENT DOCUMENTS

| | | |
|---|---|---|
| WO87/07874 | 12/1987 | PCT Int'l Appl. . |
| 133161 | 10/1919 | United Kingdom . |
| 694239 | 7/1953 | United Kingdom . |
| 2162239A | 1/1986 | United Kingdom . |
| 2162239 | 1/1986 | United Kingdom ............ 248/231.9 |

OTHER PUBLICATIONS

Copy of Pages Taken From Nokai-Mobira Brochure, FIGS. 1 and 2.

*Primary Examiner*—J. Franklin Foss
*Attorney, Agent, or Firm*—Jones, Askew & Lunsford

[57] ABSTRACT

An apparatus and method is provided for the support of an accessory unit within the defined space of a storage area. The storage area is preferably a floor-mounted console receptacle or a dashboard receptacle commonly found within the seating compartment of an automobile. The support structure provides a mounting plate that supports a radio telephone unit within the receptacle by spanning the space separating side walls of the receptacle. Engaging Velcro attachment elements mounted upon both side flanges of the mounting plate and the receptacle side walls permits the mounting plate supporting the radio telephone unit to be easily installed or removed within the receptacle. The use of Velcro elements to removably install the mounting plate within the receptacle eliminates the need for fastening screws, nuts and bolts, or rivets to mount a support structure within the storage area.

22 Claims, 3 Drawing Sheets

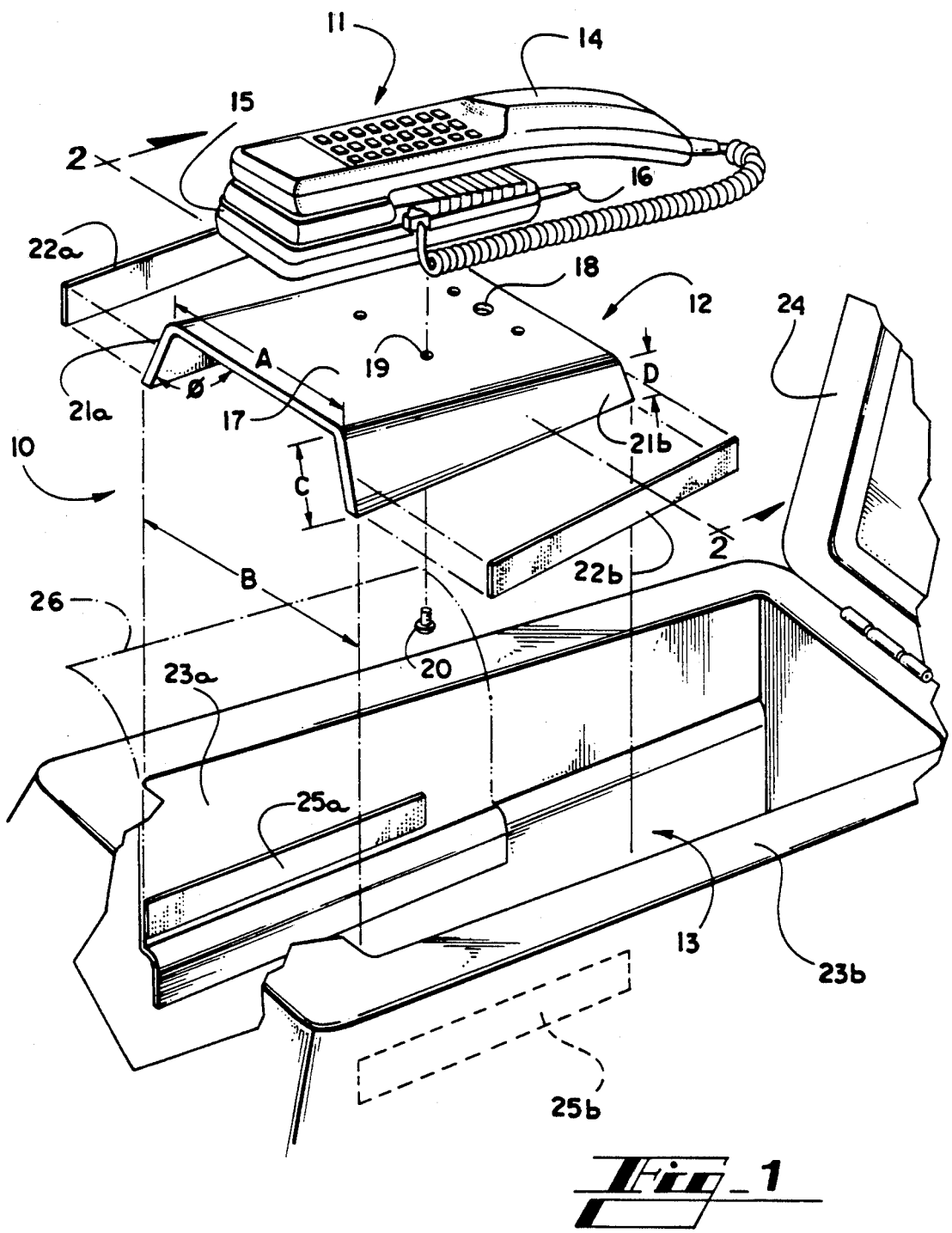
Fig_1

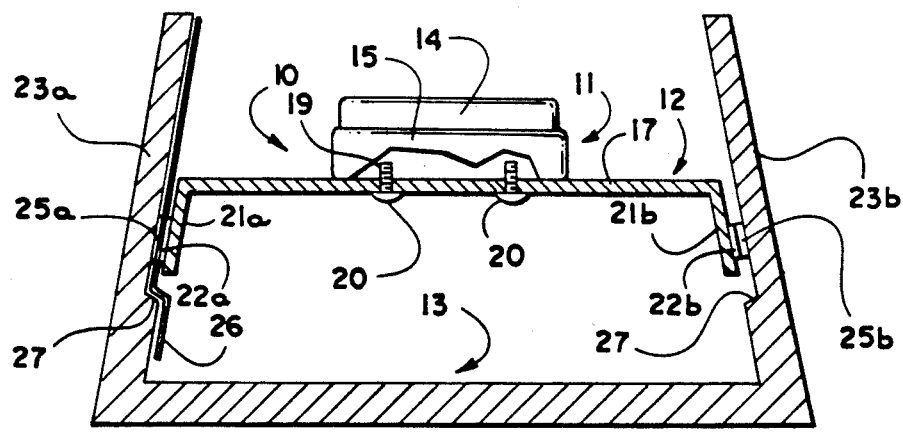
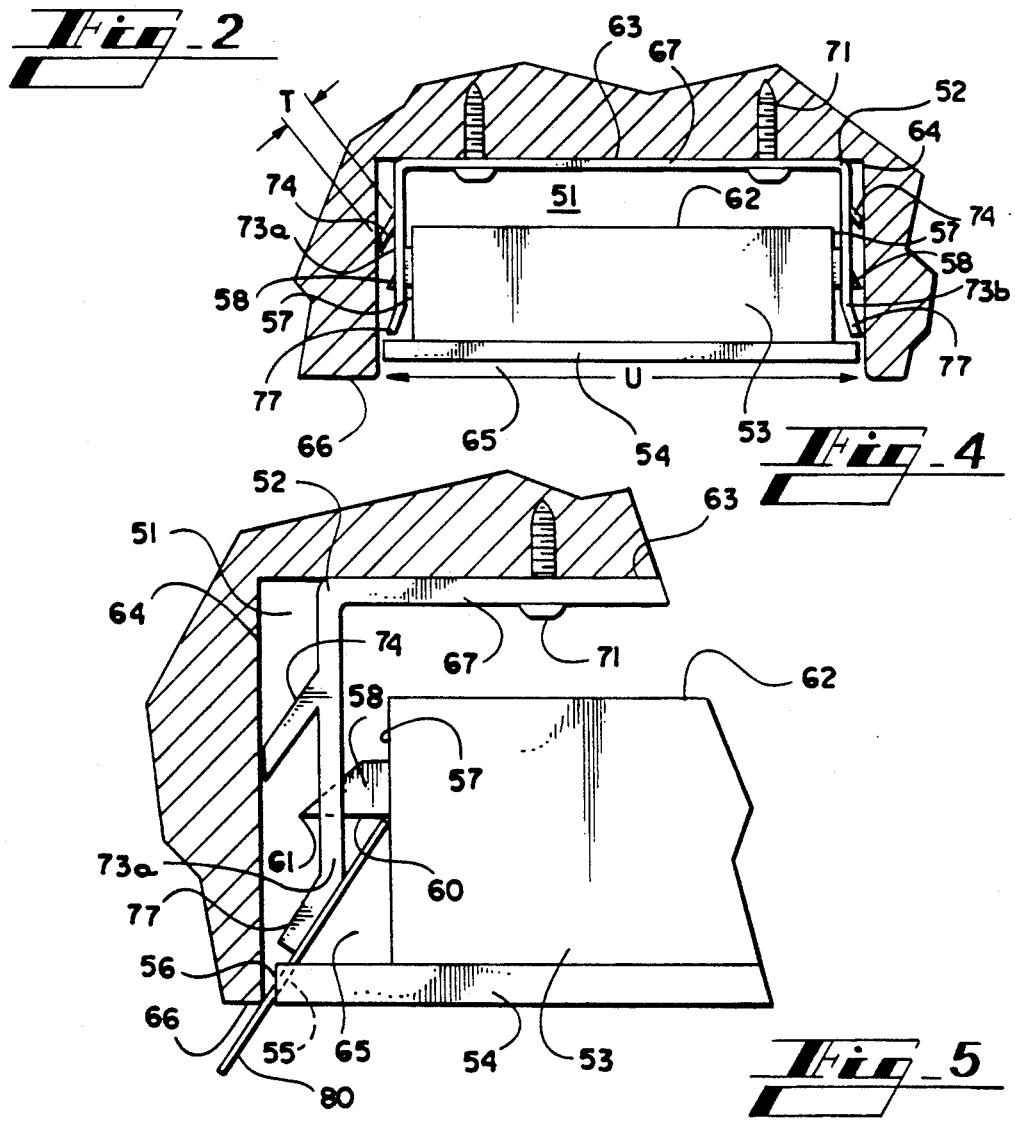

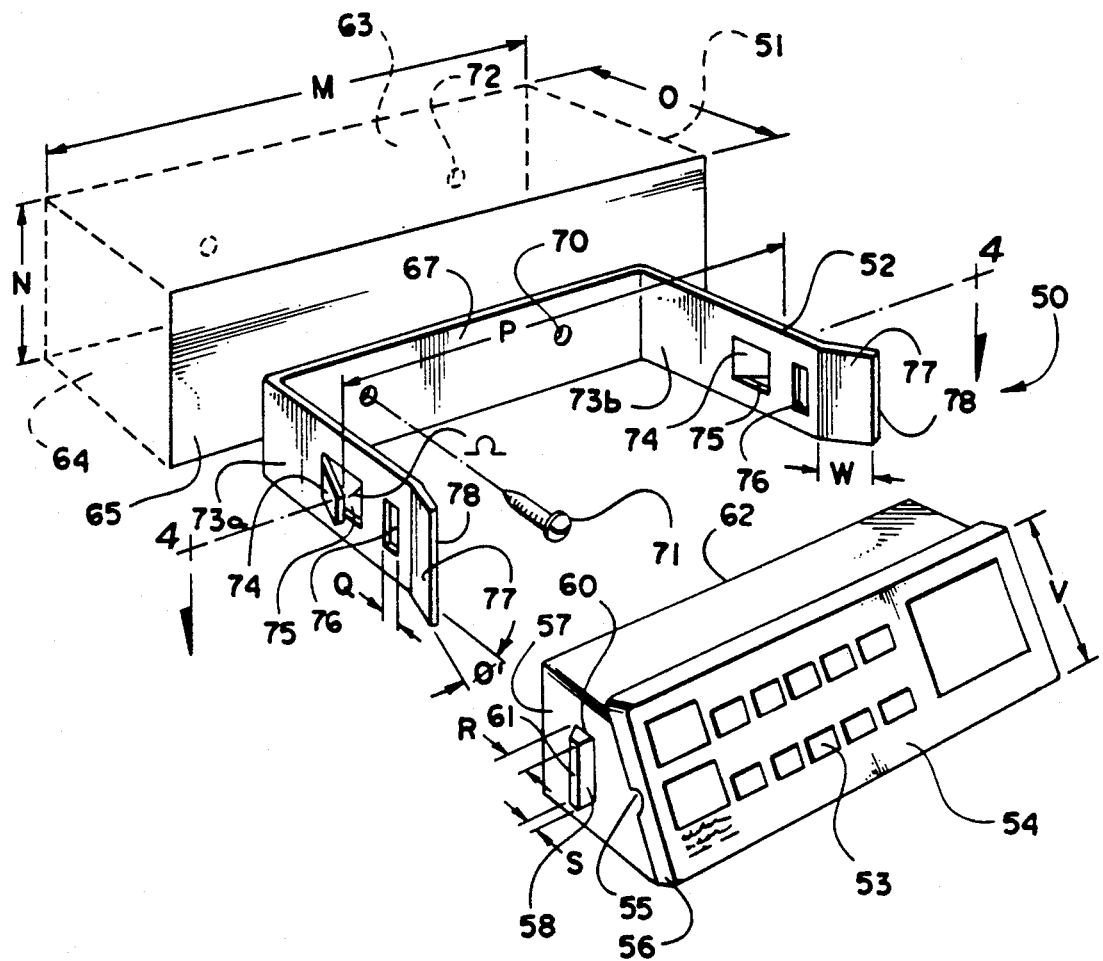
Fig_3

APPARATUS AND METHOD FOR SUPPORTING AN ACCESSORY UNIT WITHIN AN AUTOMOBILE CONSOLE

CROSS REFERENCE TO RELATED APPLICATION

This is a division of application Ser. No. 07/618,641, filed Nov. 27, 1990, by Nihiko Yasukawa, entitled "Apparatus and Method for Supporting an Accessory Unit Within an Automobile Storage Area".

TECHNICAL FIELD

The present invention relates to a structure that supports an accessory unit inside the predefined area of a console, dashboard storage area, or other storage space as found within the seating compartment of an automobile.

BACKGROUND OF THE INVENTION

Automobiles often have storage areas, including a console, dashboard storage area, or other receptacle, for storing small items inside the seating compartment of the automobile. An example of such a storage area is a console with padded top that is typically mounted between the two seats in the front seating area of the automobile so as to provide both a storage area and an arm rest for the driver or passenger. Another example of such a storage area is a compartment built into the dashboard of an automobile so as to provide a storage area for cassette tapes, sunglasses, automobile documentation, or other automobile-related driving accessories. Automobile storage areas are designed and produced by automobile manufacturers to fit the limited available space for storage in an automobile and are typically rectangular in form. Typical automobile storage areas either have a flip-top or sliding top to enclose fully items placed inside a console or are open to the automobile seating compartment to provide easy access to stored items.

The utility function of such storage areas found in an automobile may be expanded by the installation of an automotive accessory unit mounted in the storage space. Such accessories may include a radio telephone unit, radio/cassette unit, or communications radio unit.

The use of the storage area typically found inside the seating compartment of an automobile to mount an accessory unit provides an innovative and practical means for installing the accessory unit inside the often compact space of the automobile seating compartment. Automobile designers and manufacturers maximize the use of available area within the automobile seating compartment for required automobile controls, instrumentation, and seating before the production of an automobile model. Therefore, it is difficult for one to find available areas in the seating compartment of the automobile that are sufficient in size and depth to support an optional accessory unit after the production of the automobile model. The use of an existing storage area in an automobile seating compartment for the installation of an accessory unit permits one to accessorize the interior of the automobile without extensive modification of the interior by taking advantage of the predefined available space. An accessory unit installed in such a storage area may be hidden from view by closing the top of a floor-mounted console, if available, or may be installed within the instrumented dashboard to provide easy access to the unit by both the driver and a passenger. The key component for the installation of an automotive accessory unit within the existing storage area is a support structure to mount and support the unit within the storage area.

In prior art support structures, such as pedestals or brackets, the support structure has been mounted within the existing storage space by inserting fastening screws into installation holes in the structure and threading such screws into aligned, threaded storage space installation holes that either previously existed or are provided during the installation process. Alternatively, rivets or appropriate nuts and bolts have been used to install the support structure inside the existing storage area of interest. In either case, installation or removal of the support structure is difficult because of the small work area provided by the existing storage receptacles in the seating compartment of an automobile.

In some prior art structures for supporting an unit inside a console, the support structure consists of a pedestal including a unit mounting plate that is connected to a console mounting plate by a center support column of a length slightly less than the depth of the console. The accessory unit is mounted to the unit mounting plate by fastening screws and this assembly is then placed inside the console for attachment of the console mounting plate to the floor of the console with additional fastening screws. The width of the combined accessory unit and unit mounting plate assembly is typically only slightly less than that of the existing width of the console. Thus, access to the console mounting plate and installation holes within the console is obstructed by the accessory unit and the unit mounting plate assembly, despite the space provided by the column that separates the unit mounting plate from the console mounting plate. Access for attaching the accessory unit to the unit mounting plate is similarly obstructed if the console mounting plate is first installed inside the console because fastening screws for connecting the unit to the unit mounting plate are typically inserted from the bottom of the unit mounting plate to hide the installation screws and provide a more appealing installation. Similar access problems are encountered during the removal of such a support structure. Because of these unit installation and removal difficulties, an installed accessory unit supported by this prior art support structure is typically considered a near-permanent installation, making routine maintenance of the mounted unit difficult because of limited access to the support structure.

In other prior art support structures for mounting and supporting an accessory unit inside a dashboard storage area, fastening screws have typically been used to mount a U-shaped bracket of adequate width and size to support the unit of interest inside the predefined space of the storage area. The unit is inserted inside the mounted bracket and machine screws are inserted through the front of the unit into tapped holes in the bracket, thereby securing the unit inside the storage area. Easy access to the added unit for installation or removal is provided by the use of fastening screws to secure the face of the unit to the mounting bracket installed in the storage area. However, the use of visible fastening screws to mount the unit to the dashboard is not cosmetically appealing. Also, because of the natural vibrations found in the operating environment of an automobile, an installation screw may be loosened by these vibrations or may become completely dislodged over time, thereby separating the unit from the support structure and inconveniencing the driver of the automobile.

For both prior art support structures, unless the automobile designer or manufacturer envision the requirement for an accessory unit support structure, or installation holes for the support structure align with existing installation holes found in the storage space, the support structure installation holes within the console, dashboard, or surrounding structure must be provided by the installer as part of the installation process.

Therefore, there is a need for a support structure, that supports an accessory unit in an existing automobile storage space, and that is easily installed or removed without physical modification of the storage space structure. A need further exists for a cosmetically appealing support structure that supports an accessory unit within an automobile storage space. Also, there is a need for a support structure that supports an accessory unit within an automobile storage area that remains fixed despite the vibrations found in the normal operating environment of an automobile. Furthermore, there is a need for such a support structure that mounts the accessory unit inside a console or dashboard receptacle without depending completely upon the use of threaded screws, rivets, or nuts and bolts.

SUMMARY OF THE INVENTION

The foregoing problems in prior art apparatuses for supporting an accessory unit within an existing automobile storage area are solved by the present invention that secures a platform supporting the accessory unit in a position spanning the space defined by the storage receptacle without the use of threaded screws, rivets, or nuts and bolts. The invention provides this improvement by using a two-part contact attachment system, for example, the system commonly known as Velcro, to secure the platform that supports the accessory unit within the area defined by the receptacle. The two-part contact attachment system provides a novel means for securing the accessory unit within the existing receptacle without modifying the receptacle structure to include additional installment holes for fastening screws. Thus, the support structure provided by the present invention is easily installed or removed from the receptacle area.

Generally described, the present invention comprises a support structure for a receptacle defining a space surrounded by at least one wall. The receptacle is typically in the form of a rectangle, such as a console unit or a dashboard receptacle, typically provided by automobile designers and manufacturers for storage of small items within the seating compartment of an automobile. Those persons skilled in the art will recognize that the receptacle may also be polygonal or cylindrical in form. A support member spans the space between two sections of the receptacle wall and mounts between the wall sections to support the accessory unit. The support member comprises a plurality of side flanges and a load-bearing member that connects the side flanges. The side flanges are spaced apart by approximately the distance across the space between the two parallel sections of the receptacle wall. Each of the side flanges carries at least one of a plurality of first parts of a plurality of two-part attachment systems. A means capable of mounting at least one of a plurality of second parts of the two-part attachment systems to each of the two receptacle wall sections is provided such that the first parts can engage the second parts to secure the support member in a position spanning the space of the receptacle. The first and second parts of the two-part attachment systems are typically located such that engagement of the first parts to the second parts secures the support member as a horizontal floor for a supported accessory unit.

An important aspect of the preferred disclosed embodiment is that the first and second parts of the two-part contact attachment system are hook and loop elements commonly known as Velcro elements. The use of Velcro elements as a two-part contact attachment system for securing the support member provides for easy support member installation in and removal from the existing receptacle. Most importantly, the use of a Velcro attachment system for attaching the support member to the wall sections of an existing receptacle eliminates any requirement for the physical modification of the receptacle structure as an installation step for securing an accessory unit within the existing receptacle. Instead of using fastening screws or rivets to attach the support member to the receptacle, Velcro strips are attached to both the support member flanges and at least two wall segments preferably extending in spaced-apart approximately parallel planes so as to horizontally support the platform of the support member upon engagement of the hood and loop elements.

Because the first disclosed embodiment provides a support member that spans the space between at least two parallel sections of the wall, the space below the secured support member is still available for storage. Therefore, the first disclosed embodiment provides a more efficient use of the existing storage space by permitting the installation of a support structure within the receptacle and allowing the use of the area below the secured support member for the storage of small items inside the receptacle.

The support member spanning the wall of the receptacle may also prevent an observer in the seating compartment of the automobile from viewing any cabling that may connect the supported accessory unit. A cut out is preferably formed from the material of the support member and is located on the platform to permit a cable routed along the floor of the receptacle to connect an accessory unit supported by the platform without exposing the cable to the observer in the seating compartment of the automobile. Therefore, a more cosmetically appealing support structure is provided by the first disclosed embodiment of the present invention for the installation of an accessory unit, such as an electronic radio telephone unit.

For a floor-mounted console installed between the passenger and driving seats within the seating compartment of an automobile, the first disclosed embodiment provides either the driver or passenger with easy access and viewing of the supported unit installed within the console. One end of the support member platform is elevated at a higher level than the opposing end of the platform to provide the user of the supported unit, who is typically fixed at a position in a seat above and slightly behind the console, with access to and viewing of the exposed face of the unit without requiring the user to maneuver to directly peer inside the console.

The support member may be formed from a flexible material such as plastic. The use of flexible material to form the support member permits easy and economical manufacturing of support members designed to fit existing storage areas found within currently-produced automobile models. A support member comprising a flexible material is easy to position across the span of the space between the parallel wall sections of the existing receptacle so as to engage the first parts with the second parts of the two-part contact attachment systems during installation of the support member. As those persons skilled in the art will recognize, the support member may be designed to tightly fit between the spaced-apart parallel wall sections of the existing receptacle to provide sufficient surface tension between the side flanges of the support member and the parallel side walls so as to ensure a firm attachment between the first and second parts of the two-apart attachment systems. Similarly, the support member comprised of flexible material is also easy to remove because the support member structure may be flexed to disengage the first parts from the second parts of the two-part attachment system.

An alternative embodiment for the present invention is similar to the first disclosed embodiment except that it provides for side flanges comprised of planar members angularly extending from opposite sides of the support member wherein the angle between the side flanges and the support member is greater than 90 degrees. For this alternative embodiment, the distance across the space separating the top edges of the opposite planar members is less than the distance across the space separating the bottom edges of the opposite planar members. The angular side flanges of the support member provide additional surface tension between the side flanges and the spaced-apart parallel side walls upon inserting the support member within the receptacle. The additional surface tension provided by this embodiment insures firm contact between the first and second parts of the two-part contact attachment system upon installation of the support member within the receptacle. Similar to the first disclosed embodiment, the support member for the alternative embodiment comprises flexible material; this permits the installer to flex the planar members as required before completing the engagement of the first and second parts of the two-part attachment system.

The present invention also provides a method for installing a support member within a receptacle defining a space surrounded by at least one wall. The support member is utilized to support an accessory unit within the existing space provided by a storage space found within the seating compartment of an automobile. The method comprises the steps of positioning a first of one of a plurality of two-part contact attachment systems at a first location along the edge of the support member. A first part of another one of the plurality of two-part contact attachment systems is positioned at a second location along the edge of the support member. In addition, a second part of the first one of the plurality of two-part contact attachment systems is positioned along the wall of the receptacle. The first part of the other one of the plurality of two-part contact attachment systems is engaged with a corresponding second part that is positioned along the wall of the receptacle. After covering the second part of the first one of the plurality of two-part contact attachment systems with a sheet of nonadhering material, the first part of the first one of the plurality of two-part contact attachment systems is positioned adjacent to the second part of the first one so as to be separated therefrom by the nonadhering material. Removing the nonadhering material permits the engagement of the first and second parts of the first one of the plurality of two-part contact attachment systems.

The present invention also provides a mounting bracket for supporting a unit in an existing receptacle defining a space surrounded by two spaced-apart side walls that intersect a back wall. The mounting bracket provided by the present invention permits the installation of an accessory unit within the storage space defined, for example, by a dashboard compartment such that the face of the accessory unit is mounted just inside the face of the open dashboard compartment and without the use of fastening screws to attach the face of the accessory unit to the mounting bracket installed within the receptacle.

Stated generally, this aspect of the present invention provides a bracket member that includes a pair of support arms connected by a connecting member such that the support arms are spaced apart by approximately the distance across the space between two spaced-apart side walls that define a receptacle space. Mounting means are used to attach the bracket member to a back wall of the receptacle that is intersected by the two spaced-apart side walls. At least one tab element is located on at least one of the support arms such that the tab element engages an adjacent side wall upon inserting the bracket member into the receptacle. The tab element is located on the support arm such that the element extends angularly toward the side wall, which the tab engages upon insertion of the bracket member into the receptacle. A projection is located on an accessory unit so that the unit can be secured in a position spanning the distance across the space between the support arms of the bracket member upon inserting the projection into an installation hole located on at least one of the support arms containing said tab element.

More specifically, the present invention provides a mounting bracket with support arms that extend in parallel from opposite edges of the connecting member. A tab element is cut out and formed from the material of one of the support arms such that the tab engages a side wall upon inserting of the bracket into the receptacle. The angle formed between the tab element and the support arm is less than 90 degrees. Because the preferred embodiment for this aspect of the invention provides a bracket member comprising of a flexible material, such as plastic, the tab element provides additional mounting support for the inserted bracket member because of surface tension that arises upon engagement of the tab element with the side wall. Nevertheless, those persons skilled in the art will recognized that the bracket member may be comprised of a material other than flexible material so that the tab element also provides additional mounting support for the inserted bracket member. Thus, the tab element is available to secure the bracket member in place by a barb-like gripping action if the mounting means for the bracket member becomes loose. One recognizes that the operating environment of an automobile provides natural vibrations within the seating compartment of the automobile such that a fastening screw may be loosened over time. Therefore, the tab element is available to prevent the mounting bracket from moving outside the receptacle in the event that the mounting means is loosened over the course of normal automobile driving conditions.

The tab element also provides sufficient space between the side wall and the support arm such that the installation hole located on the support arm can accept the projection that secures the accessory unit within the mounting bracket and, therefore, also secures the unit within the receptacle. The engagement of the tab element with the side wall pushes the support arm inward and away from the side wall such that the support arm firmly holds the unit in place upon the projection mating with the installation hole on the support arm. Thus, the bracket member firmly supports the inserted unit within the receptacle without the use of fastening screws to attach the front panel of the unit to the face of the receptacle. Also, the bracket member is designed to mount within the existing storage space provided by the automobile seating compartment such that additional modification is not required for the installation of the bracket member within the receptacle of interest.

The present invention presents a cosmetically appealing installation of the unit within the existing receptacle space by the absence of fastening screws for attaching a front panel of the inserted unit to the face of the receptacle. Specifically, fastening screw heads are not visible to a driver or passenger within the seating compartment of the car. Also, the unit is easy to install within the receptacle because the mounting means for the bracket member is typically provided by fastening screws that connect the bracket member to the back wall of the receptacle; once the bracket member is installed, the accessory unit is merely inserted inside the installed bracket member to secure the unit within the existing receptacle. Physical modifications of the existing receptacle space are not required for installing the present invention within predefined storage space because the mounting means is preferably aligned with currently existing installation holes located on the back wall of the receptacle.

Preferably, both support arms define tab elements and installation holes. Therefore, the tab element located on each of the support arms engages the side wall closest to that tab element. Each tab element extends angularly toward and engages the side wall closest to the tab element upon insertion of the bracket member into the receptacle. Also, the installation hole located on each of the support arms can accept one of a pair of projections located on the accessory unit such that the unit can be secured in a position spanning the distance across the space between the support arms of the bracket member.

The angular tab elements located on each of the support arms provide additional mounting support for the bracket member upon insertion of the member into the receptacle. Similarly, the installation hole located on each of the support arms firmly secures the unit upon accepting the projection located on the unit. Therefore, this alternative embodiment provides an even more secure installation for the accessory unit supported in an existing receptacle found in the seating compartment of an automobile.

An angular guide protrusion is preferably positioned at the end of the support arms opposite the connecting member. The angular guide protrusion is positioned to ease the insertion of the unit within the bracket member such that the projection located on the unit is easily accepted by the installation hole. To facilitate the installation of the unit and to securely support the installed unit, the installation hole is located on each of the support arms between the location of the angular guide protrusion and the location of the tab element. The installation hole is positioned on each support arm such that the mating of each of the projections located on the accessory unit with the appropriate installation hole positions the front panel of the accessory unit inside the receptacle and abutting each of the angular guide protrusions. The front panel as installed completely covers each of the angular guide projections and abuts each of the side walls of the receptacle.

The installed accessory unit is easily removed by inserting a removable tool into a notch located at the edge of the front panel of the unit nearest one of the side panels of the unit. The angular guide protrusion is positioned on the support arm to permit the removal tool to be inserted into the notch and between the protrusion and the side panel of the unit. By using the removal tool as a lever, the removal tool is forced against the angular guide protrusion so as to separate the projection of the object from its installment hole mate. The front unit edge containing the notch may then be removed from the bracket member, thereby permitting the remaining body of the unit to be removed from the receptacle.

The present invention also provides a method for securing a unit into a receptacle defining a space surrounded by two parallel spaced-part side walls that intersect a back wall. First, a U-shaped bracket member comprising parallel spaced-apart support arms is inserted inside the receptacle. At least one angular tab element located on each of the support arms engages one of the side walls upon insertion of the bracket inside the receptacle. Next, the bracket member is secured to the back wall with fastening means. Then, a unit comprising a pair of projections is inserted between the support arms such that each of the projections mates with an installment hole located on each of the support arms so as to secure the unit inside the bracket member.

The present invention also provides a method for removing an unit, comprising a front panel connected to at least one side panel, from a U-shaped mounting bracket installed in a receptacle. The method comprises the steps of inserting a removal tool into a notch located on the front panel closest to one side panel; positioning the removal tool such that the tool rests between the side panel and a guide protrusion positioned at an end of an arm attached to the U-shaped mounting bracket; applying sufficient pressure to the removal tool such that a projection located on the side panel is separated from an installment hole located on the arm; and disengaging the edge of the front panel nearest the notch from the receptacle.

Therefore, it is an object of the present invention to provide a support structure for supporting an accessory unit that is easily installed in and removed from a receptacle.

It is a further object of the present invention to support an accessory unit inside a receptacle by providing a support structure that requires no physical modification of the receptacle during installation or removal of the support structure.

It is a further object of the present invention to support an accessory unit inside a receptacle by providing a support structure that requires no additional screws, rivets or nuts and bolts to mount the structure to the receptacle.

It is a further object of the present invention to support an accessory unit inside a receptacle by providing a support structure that hides any cabling required by the accessory unit.

It is a further object of the present invention to provide a convenient, time-saving, and inexpensive support structure to mount and support an accessory unit inside a receptacle.

It is a further object of the present invention to support an accessory unit inside a receptacle by providing a support structure that permits easy access to the supported accessory unit or removal thereof for maintenance and service of the accessory unit.

It is a further object of the present invention to support an accessory device inside a receptacle by providing a support structure that permits the receptacle space under the structure to be used for purposes other than the mounting of the structure inside the receptacle.

It is a further object of the present invention to support an accessory unit inside a receptacle by providing a support structure that secures the accessory unit inside the structure while resisting vibrations in the operating environment of the receptacle.

It is a further object of the present invention to support an accessory unit inside a receptacle by providing a support structure that allows a cosmetically appealing installation of the unit inside the receptacle.

That the present invention and the embodiments thereof overcome the drawbacks set forth above and accomplish the objects of the invention set forth herein will become apparent from the detailed description of the preferred embodiment to follow.

BRIEF DESCRIPTION OF THE DRAWING

FIG. 1 is an exploded view of a console support structure embodying the present invention.

FIG. 2 is a front cross-sectional view taken along line 2—2 of FIG. 1 of a support structure embodying the present invention as installed within a receptacle.

FIG. 3 is an exploded view of a dashboard support bracket embodying the present invention.

FIG. 4 is a top cross-sectional view taken along line 4—4 of FIG. 3 of the support bracket of FIG. 3 installed within a receptacle.

FIG. 5 is an enlarged partial top cross-sectional view of an embodiment of the present invention installed within a receptacle, including the application of a removal tool for removal of a unit installed within the receptacle.

DETAILED DESCRIPTION OF THE PREFERRED EMBODIMENT

Referring now to the drawings in which like numerals indicate like elements throughout the several figures, FIG. 1 is an exploded view of a support structure 10 embodying the present invention. Generally speaking, the support structure 10 provides a mounting plate 12 that includes a platform 17 to support a radio telephone unit 22 within a receptacle 13. In the preferred embodiment, the receptacle 13 is a floor-mounted console found within the seating compartment of an automobile. Of course, the mounting plate 12 could be installed in other receptacles or storage areas. The radio telephone unit 11 is representative of various automobile accessory items that can be supported by the mounting plate 12 in the receptacle 13.

The radio telephone unit 11 includes a radio telephone handset 14, that is secured by a radio telephone cradle mount 15 when the radio telephone handset 14 is not utilized by a driver or passenger for telephone communication. The physical size of the radio telephone unit 11 permits the unit to be properly installed within an automobile storage area such as the receptacle 13. A cradle cable 16 is attached to the radio telephone cradle mount 15 to provide the radio telephone unit 11 with access to control cabling or necessary electrical power typically provided by an automobile electrical power supply. The radio telephone unit 11 is mounting to the mounting plate 12 by attaching the radio telephone cradle mount 15 to the platform 17. The radio telephone cradle mount 15 is preferably located at a central location on the platform 17; this permits a user of the radio telephone unit 11 to easily access the unit once installed in the receptacle 13. More specifically, the central location of the radio telephone cradle mount 15 on the platform 17 permits the user to easily reach inside the receptacle 13 and detach the radio telephone handset 14 from the installed radio telephone cradle mount 15 for radio telephone communication.

Several cradle mount installation holes 19 (four in the embodiment shown) are located on the central portion of the platform 17. The radio telephone unit 11 is attached to the mounting plate 12 by inserting cradle mount installation screws 20 through the cradle mount installation holes 19 and into aligned tapped installation holes contained on the bottom of the radio telephone cradle mount 15. As illustrated in FIG. 1, the threading of the cradle mount installation screws 20 into the cradle mount installation holes 19 is begun from the bottom of the platform 17 to provide a more cosmetically appealing mounting of the radio telephone unit 11 to the mounting plate 12. In this manner, the heads of cradle mount installation screws 20 are not visible within the receptacle 13 to the driver or a passenger seated within the automobile. However, positioning the screws in this manner creates a need for convenient access to the bottom of the plate 12. The present invention satisfies this need as will be described below.

Also, the cradle cable 16 is preferably passed through a platform cut out 18 located on the platform 17 before connecting the cradle cable 16 to control cabling or automobile electrical power supply cabling. Cabling of the radio telephone unit 11 to the electrical power supply of the automobile may be required to power the operating unit. The platform cut out 18 is positioned on the platform 17 to permit the cradle cable 16 to be passed through the platform cut out 18, thereby concealing the routing of the cradle cable 16 upon installation of the mounting plate 12 within the receptacle 13. Therefore, cabling the radio telephone unit 11 to the control cables or the automobile electrical power supply via the platform cut out 18 provides a more cosmetically appealing installation of the unit.

The mounting plate 12 includes side flanges 21a and 21b connected to opposite sides of the platform 17. In the preferred embodiment of FIG. 1, the side flanges 21a and 21b are angularly attached to the opposite edges of platform 17. The angle formed between the platform 17 and the side flange 21, side flange angle $\phi$, is greater than 90 degrees. For the preferred embodiment of the mounting plate 12, angle $\phi$ is 105 degrees. Also, the mounting plate 12 comprises a flexible material such as plastic. The flexible material is preferably A B S resin. The flexible characteristics of the side flanges 21a and 21b, in combination with the angular attachment of the side flanges 21a and 21b to the opposite sides of the platform 17, permits a user to easily install or remove the mounting plate 12 within the receptacle 13.

FIG. 1 also illustrates that side flange fasteners 22a and 22b are located upon the respective sides of the side flanges 21a and 21b. The side flange fasteners 22a and 22b are selected parts of a two-part contact attachment system. In particular, the side flange fasteners 22a and 22b are either hook or loop elements commonly known as Velcro elements. The side flange fasteners 22a and 22b are attached to the respective sides of the side flanges 21a and 21b by any appropriate mounting means, such as a contact adhesive provided on the back of the Velcro element in a well-known manner. For the preferred embodiment, each side flange fastener 22 is an attachment strip extending horizontally along each side flange 21. The engagement of the side flange fasteners 22a and 22b to a corresponding pair of receptacle side wall fasteners 25a and 25b provides for a removable installation of the mounting plate 12 within the receptacle 13, as will be described in more detail below.

As shown in FIG. 1, the mounting plate front height C is greater than the mounting plate back height D. The front height C is greater than the back height D to provide a sloping floor for supporting the radio telephone unit 11 upon installation of the mounting plate 12 within the receptacle 13. Because a driver or passenger in the front seating compartment of an automobile is seated adjacent to and slightly behind a floor mounted console, the mounting plate 12 is preferably installed within the receptacle 13 so that the front section of the mounting plate 12 is facing the front of the receptacle 13. Therefore, installation of the mounting plate 12 within the receptacle 13 in the preferred manner provides a slightly sloping platform 17 that supports the radio telephone unit 11 and permits the user to easily view and grasp the radio telephone hand set 14 located within the receptacle 13.

FIG. 1 further illustrates that the receptacle 13 includes a pair of receptacle side walls 23a and 23b, a receptacle lid 24, and a pair of receptacle side wall shelves 27a and 27b. In the preferred embodiment, the receptacle side walls 23a and 23b are spaced apart and are positioned directly opposite each other. The space separating the receptacle side walls 23a and 23b preferably defines an area sufficient to mount the radio telephone unit 11 within the receptacle 13. The receptacle lid 24 permits the driver or passenger to cover the opening of the receptacle 13 by closing the lid 24. The receptacle side wall shelves 27a and 27b are respectively positioned on the faces of the side walls 23a and 23b. Although the location of the side wall shelves 27a and 27b can vary, the shelves 27a and 27b can be respectively positioned on the side walls 23a and 23b such that the shelves 27a and 27b provide a surface for the side flanges 21a and 21b to rest upon after installation of the mounting plate 12. In this manner, the shelves 27a and 27b may optionally provide additional support for the installed mounting plate 12.

A pair of receptacle side wall fasteners 25a and 25b are attached to the respective side walls 23a and 23b. Selected to engage the side flange fasteners 22a and 22b, the receptacle side wall fasteners 25a and 25b are corresponding parts of a two-part contact attachment system. The receptacle side wall fasteners 25a and 25b are preferably the reciprocal mate to the attachment element selected for the pair of side flange fasteners 22a and 22b. Thus, receptacle side wall fasteners 25a and 25b are either hook or loop elements of a two-part contact attachment system commonly known as Velcro elements.

For the preferred embodiment, the receptacle side wall fasteners 25a and 25b are strips of Velcro extending horizontally along respective side walls 23a and 23b. The length of the receptacle side wall fasteners 25a and 25b is preferably the same length as their reciprocal parts of the two-part contact attachment system, the side flange fasteners 22a and 22b. The receptacle side wall fasteners 25a and 25b are mounted to the receptacle side walls 23a and 23b by any appropriate mounting means, such as a contact adhesive provided on the back of the Velcro element in a well-known manner. To provide a horizontal support for the radio telephone unit 11, the receptacle side wall fasteners 25a and 25b are positioned along the receptacle side walls 23a and 23b so that engagement by both parts of the two-part contact attachment system along both sides of the mounting plate 12 fixes the mounting plate 12 in a generally horizontal position with a sloping platform 17 as described above.

FIG. 2 shows a front cross-sectional view of the support structure installed within the receptacle 13. Before installing the mounting plate 12 within the receptacle 13, the radio telephone unit 11 is attached to the platform 17 by inserting the cradle mount installation screws 20 through the cradle mount installation holes 19 and into aligned tapped installation holes contained on the bottom of the radio telephone cradle mount 15. Installation of the mounting plate 12 within the receptacle 13 is easily accomplished by first positioning the mounting plate 12 to engage a selected side flange fastener 22b with the corresponding side wall fastener 25b. A paper sheet 26 is then positioned along the side wall 23a to temporarily prevent the engagement of the side flange fastener 22a with the receptacle side wall fastener 25a. Side flange 21a with the fastener 22a is then positioned adjacent to the receptacle side wall 23a with the fastener 25a. By rotating the mounting plate 12 to align the fastener 22a with the fastener 25a, thereby sliding the fastener 22a over the paper sheet 26, the paper sheet 26 then can be removed from the receptacle 13 so that the side flange fastener 22a engages the receptacle side wall 25a and firmly attaches the mounting plate 12 within the receptacle 13. Thus, the radio telephone unit 11 is supported by the mounting plate 12 within the receptacle 13.

The support structure 10 provides a firmly attached support for the radio telephone unit 11 within the receptacle 13 by providing sufficient surface tension between the side flange fasteners 22 and receptacle side wall fasteners 25. Strong surface tension is provided upon installation of the mounting plate 12 within the receptacle 13 because the bottom width B of the mounting plate 12 is greater than the top width A of the mounting plate 12. More specifically, the bottom width B, established prior to the installation of the mounting plate 12 within the receptacle 13, is greater than the distance across the space between the receptacle side walls 23a and 23b at the points of attachment by the fasteners. The flexibility of the mounting plate 12 permits the installer to flex the mounting plate 12 so that the mounting plate 12 fits within the receptacle 13. Because of this flexibility, the mounting plate 12 can be easily removed from the receptacle 13 merely by flexing the mounting plate 12 so as to disengage the side flange fasteners 22a and 22b and the receptacle side wall fasteners 25a and 25b.

Thus, the support structure 10 provides a removable installation of the mounting plate 12 within the receptacle 13. This feature provides easy access to the installation screws 20 on the bottom of the mounting plate 12. Also, the support structure 10 provides a cosmetically appealing installation of the radio telephone unit 11 because the mounting plate 12 conceals the control cables and electrical power cables required for the operation of the radio telephone unit 11, as well as the installation screws 20 required to attach the radio telephone unit 11 to the platform 17. In addition, the installation of the support structure 10 permits the use of the storage space beneath the installed mounting plate 12 for the storage of small items.

FIG. 3 is an exploded view of another embodiment of the present invention. Generally speaking, FIG. 3 shows a dashboard support structure 50 including a mounting bracket 52 that supports an accessory unit 53 within a dashboard receptacle 51. In the preferred embodiment, the dashboard receptacle 51 is a storage area preferably located within the dashboard found in the seating compartment of an automobile. Of course, other storage areas can be substituted for the dashboard receptacle 51. In the embodiment of FIG. 3, the accessory unit 53 is the control unit for a radio telephone unit installed within the seating compartment of an automobile. Nevertheless, various alternative automobile accessory units, such as an optional automobile stereo component, could be mounted in the receptacle 51.

The accessory unit 53 includes a unit front panel 54 that intersects and extends laterally beyond a common end of spaced-apart parallel unit side panels 57. A unit back panel 62 intersects and extends laterally beyond the opposite common end of the spaced-apart parallel unit side panels 57. As illustrated in FIG. 3, the unit front panel 54, the unit side panels 57, and the unit back panel 62 provide a rectangular form that can be properly installed within the space defined by the dashboard receptacle 51. It will be understood, however, that the concept of the invention can be utilized in connection with units and receptacles having different shapes.

The unit front panel 54 includes two vertical front panel edges 56 located on opposite edges of the unit front panel 54 and adjacent to the unit side panels 57. A front panel notch 55 is located along one of the front panel edges 56 and permits the insertion of a removal tool 80 for the removal of the accessory unit 53 from the mounting bracket 52 installed within the dashboard receptacle 51 as described below. As illustrated in FIG. 3, the unit front panel 54 typically provides the driver and passenger seated within the seating compartment of an automobile with control function selections and control indications for the installed accessory unit 53 mounted within the dashboard receptacle 51.

The lenght of the unit front panel, unit front panel length U, is approximately the minimum distance across the space separating the side walls of receptacle 51, receptacle side walls 64. The front panel height V is approximately equal to the receptacle height N. Thus, as illustrated in FIG. 3, the unit front panel 54 provides a panel approximately the length and height required to just fit within the space defined by dashboard receptacle opening 65. The unit front panel 54 thus provides a cosmetically appealing appearance for the installed accessory unit 53 mounted within the dashboard receptacle 51.

A unit projection 58 is attached to the exterior side of each of the unit side panels 57. The unit projections 58 are provided for mounting the unit in a manner described below. The unit projection 58 consists of a projection base 60 tapering to a projection tip 61. The projection base 60 is attached to or formed integrally with the exterior of the unit side panel 57. The unit projection width R is greater than the unit projection tip width S to assist in both the installation and the removal of the accessory unit 53 within the mounting bracket 52 located inside the dashboard receptacle 51.

The dashboard receptacle 51 includes a dashboard receptacle back wall 63 that connects to spaced-apart parallel dashboard receptacle side walls 64 to provide a dashboard receptacle opening 65 along dashboard face 66. The dashboard face 66 is typically a flat surface found along the instrument section of an automobile dashboard. As illustrated in FIG. 3, the dashboard receptacle 51 provides a rectangular form of sufficient space for the storage or mounting of an automobile accessory unit. Receptacle depth O is sufficient to permit the installation of the mounting bracket 52 and the accessory unit 53 within the dashboard receptacle 51. Similarly, receptacle height N and side walls separation M are sufficient to accommodate installation of the mounting bracket 52 and the accessory unit 53 within the dashboard receptacle 51. Although the embodiment of FIG. 3 illustrates an uncovered opening for the dashboard receptacle opening 65 located along the dashboard face 66, the dashboard receptacle 51 can also include a dashboard receptacle opening that is covered by a lid or cover positioned flush with the dashboard face 66 so that the installed accessory unit 53 is hidden within the dashboard receptacle 51.

FIG. 3 also illustrates that the mounting bracket 52 is preferably formed in a "U shape" and includes a connecting bar 67 and left and right support arms 73a and 73b. The mounting bracket 52 is installed within the dashboard receptacle 51 to secure the accessory unit 53 within the dashboard receptacle 51. In particular, the mounting bracket 52 provides a mechanism for removably installing the accessory unit 53 within the dashboard receptacle 51. In the preferred embodiment, the mounting bracket 52 comprises flexible material such as plastic, but could be constructed of metal. The connecting bar 67 connects the left and right support arms 73a and 73b such that the support arms are spaced apart by approximately the minimum distance separating the pair of side walls 64, side walls separation M.

Mounting bracket installation holes 70 are located along the connecting bar 67. The connecting bar 67 is positioned within the dashboard receptacle 51 such that the mounting bracket installation holes 70 align with the tapped receptacle installation holes 72 provided in the back wall 63. Mounting bracket installation screws 71 can than be inserted through the aligned installation holes and threaded into the dashboard receptacle back wall 63 to mount the mounting bracket 52 within the dashboard receptacle 51. Those persons skilled in the art will recognize that fastening means other than fastening screws can be utilized to mount the mounting bracket 52 within the dashboard receptacle 51.

Left and right support arms 73a and 73b extend from opposite ends of the installed connecting bar 67 towards the opening of the receptacle 51. Because the left support arm 73a is constructed and operated in an identical manner as the right support arm 73b, only the left support arm will be described in detail. The left support arm 73a includes, in sequence starting from the connecting bar 67, a tab 74, a projection installation hole 76, and an angular guide 77. The tab 74 is cut out of the material forming the left support arm 73a. A tab opening 75 is provided by the angular separation of the tab 74 from the left support arm 73a. Tab angle $\Omega$ defines the angular separation between the tab 74 and the left support arm 73a. The tab angle $\Omega$ is less than 90 degrees. The tab angle $\Omega$ is preferably 20 degrees. The left support arm 73a and the right support arm 73b supports the accessory unit 53 upon installation of the unit within the mounting bracket 52 located inside the dashboard receptacle 51.

The tab 74 angularly extends from the left support arm 73 and faces away from the dashboard receptacle back wall 63 such that the tab 74 engages one of the dashboard receptacle side walls 64 upon installation of the mounting bracket 52 within the dashboard receptacle 51. Because the tab 74 is a flexible extension of the left support arm 73, the tip of the tab 74 flexes upon the engagement of the tab 74 with one of the dashboard receptacle side walls 64. The tab 74 tends to act as a barb to frictionally retain the mounting bracket 52 within the dashboard receptacle 51 in response to an outward force on the mounting bracket 52. Specifically, the tab 74 tends to frictionally retain the mounting bracket 52 within the dashboard receptacle 51 if one of the mounting bracket installation screws 71 becomes loose because of the natural vibrations occurring in the automobile operating environment.

Also, the distance across the space separating the left and right tabs 74 prior to installation of the mounting bracket 52, tab separation P, is greater than the minimum distance across the space separating the side walls 64, side wall separation M. Thus, installing the mounting bracket 52 within the dashboard receptacle 51 forces the tab 74 to engage the dashboard receptacle side wall 64 and push the left support arm 73a inward. Because the support arm 73a is inwardly spaced from the side wall 64, sufficient space between the left support arm 73a and the side wall 64 is provided to accommodate the unit projection 58 extending through the projection installation hole 76 upon insertion of the accessory unit 53 within the mounting bracket 52.

The projection installation hole 76 is located along the left support arm 73a between the tab 74 and the angular guide 77. The projection installation hole 76 accepts the unit projection 58 upon the installation of the accessory unit 53 within the mounting bracket 52. The width of the projection installation hole 76, projection installation hole width Q, is sufficient to accept the unit projection 58. Specifically, projection installation hole width Q is slightly greater than the unit projection base width R. As illustrated in FIG. 3, the projection installation hole 76 is rectangular in form and cut out of the left support arm 73a.

Angular guide 77 is preferably formed integrally of the material of the bracket 52 at the end of the left support arm 73a opposite the connection bar 67. The angular guide 77 angularly extends toward the dashboard receptacle side wall 64 upon installation of the mounting bracket 52 within the dashboard receptacle 51. The tab 74, of length T, extends outwardly beyond a line connecting an extending end 78 of the angular guide 77 and the intersection of the left support arm 73a with the connecting bar 67. The length of angular guide 77 is represented by angular guide length W. The angle formed between the angular guide 77 and the left support arm 73a, angular guide angle $\phi'$, which is less than the angle formed between the tab 74 and the left support arm 73a, tab angle $\Omega$. Angular guide angle $\phi'$ is preferably 15 degrees.

The angular guide 77 is positioned at the end of the left support arm 73a and guides the unit projection 58 within the projection installation hole 76 upon the insertion of the accessory unit 53 within the mounting bracket 52. In addition, the angular guide 77 provides sufficient space between the unit side panel 57 and the left support arm 73a to permit the insertion of the removal tool 80 for removal of the accessory unit 53 from the mounting bracket 52. Tab 74 engages the dashboard receptacle side wall 64 and pushes the left support arm 73a inward, thereby preventing the angular guide 77 from engaging the dashboard receptacle side wall 64. Sufficient space is required between the angular guide 77 and the dashboard receptacle side wall 64 so that, as described below, the removal tool 80 can be properly utilized to remove the accessory unit 53 from the mounting bracket 52.

The mating of the unit projection 58 with the projection installation hole 76 positions the unit front panel 54 inside the dashboard receptacle 51 and abutting the angular guide 77, as shown in FIG. 4. The unit front panel 54 is of sufficient length to completely cover the angular guide 77 and extend closely adjacent to each of the dashboard receptacle side walls 64.

Referring now to FIG. 4, for installation of the accessory unit 53 within the dashboard receptacle 51, the mounting bracket 52 must first be mounted along the dashboard receptacle back wall 63 by the use of the mounting bracket installation screws 71. Upon mounting the mounting bracket 52 inside the dashboard receptacle 51, the tabs 74 engage the dashboard receptacle side walls 64 and push the left and right support arms 73a and 73b inward. The accessory unit 53 is then inserted within the mounting bracket 52 so that the unit projections 58 force the angular guides 77 outward before the projections snap into their projection installation holes 76. The support arms 73a and 73b are pushed inward by the tabs 74 engaging the receptacle side walls 64 such that the unit projections 58 are firmly confined by the projection installation holes 76 for the normal operating environment of an automobile. Thus, fastening screws are not required to attach the unit front panel 54 to the dashboard face 66 or to the mounting bracket 52.

The dashboard support structure 50 provides a support structure that firmly fixes the accessory unit 53 within the dashboard receptacle 51 despite the normal vibrations arising within the operating environment of an automobile. In addition, the dashboard support structure 50 provides a cosmetically appealing support structure for the installation of the accessory unit 53 within the dashboard receptacle 51 because the unit front panel 54 is of sufficient length and height to completely cover the mounting bracket 52 installed within the dashboard receptacle 51.

FIG. 5 illustrates the insertion of the removal tool 80 into the front panel notch 55 in preparation for the removal of the accessory unit 53 from the mounting bracket 52 located inside the dashboard receptacle 51. The removal tool 80 is positioned between the angular guide 77 and the unit side panel 57. By applying sufficient pressure to the removal tool 80 in a direction across and parallel to the unit front panel 54, the left support arm 73a is displaced until the unit projection 58 is separated from the projection installation hole 76. The separation of the unit projection 58 from the projection installation hole 76 permits the disengagement of the periphery of the unit front panel 54 nearest the front panel notch 55 from the dashboard receptacle 51. Sufficient clearance then exists to remove the entire unit.

The preferred embodiment of the present invention has been disclosed by way of an example and it will be understood that other modifications may occur to those skilled in the art without departing from the scope and the spirit of the appended claims.

I claim:

1. A support structure, comprising:

a receptacle defining a space, said space surrounded by a plurality of intersecting wall segments, at least two of said wall segments extending in spaced-apart parallel planes;

a mounting plate including a plurality of side flanges and a platform connecting said side flanges such that said side flanges are spaced apart by approximately the distance across said space between said parallel wall segments;

said side flanges including planar members angularly extending from opposite edges of said platform to form angles between said side flanges and said platform that are greater than 90°, wherein the height of said planar members is greater at one end of said opposite edges of said platform than at an opposing end of said opposite edges of said platform;

a plurality of first parts of a plurality of two-part attachment systems, each of said side flanges carrying at least one of said first parts;

a plurality of second parts of said two-part attachment system, at least one of said second parts located on said parallel wall segments; and means capable of mounting at least one of said second parts to said parallel wall segments such that said first parts can engage said second parts so as to secure said mounting plate in a position spanning said space.

2. The apparatus of claim 1, wherein the distance across the space separating the top edges of said opposite planar members is less than the distance across the space separating the bottom edges of said opposite planar members.

3. The apparatus of claim 1, wherein said mounting plate comprises a flexible material.

4. The apparatus of claim 1, wherein at least one of said first parts of said two-part attachment systems comprises a selected one of either a hook member or a loop member.

5. The apparatus of claim 4, wherein at least one of said second parts of said two-part attachment systems comprises the nonselected one of either said hook member or said loop member.

6. The apparatus of claim 5, wherein said two-part attachment systems are Velcro.

7. The apparatus of claim 5, wherein said first and second parts of said two-part attachment systems are located such that engaging said hook member with said loop member positions said mounting plate as a horizontal floor to support an unit located on said floor.

8. The apparatus of claim 5, wherein said mounting plate is removable from said receptacle by disengaging said hook member from said loop member.

9. The apparatus of claim 1, wherein said platform comprises fastening means for connecting an unit to said platform.

10. The apparatus of claim 1, wherein said first and said second parts of said two-part attachment systems are located such that engaging said first parts with said second parts positions said support member as a horizontal floor to support an unit located on said floor.

11. The apparatus of claim 1, wherein said mounting plate is removable from said receptacle by disengaging said first parts from said second parts.

12. A support structure, comprising:

a receptacle defining a space, said space surrounded by a plurality of intersecting wall segments, at least two of said wall segments extending in spaced-apart parallel planes;

a mounting plate including a plurality of side flanges and a platform connecting said side flanges such that said side flanges are spaced apart by approximately the distance across said space between said parallel wall segments;

said side flanges including planar members angularly extending from opposite edges of said platform, wherein the height of said planar members is greater at one end of said opposite edges of said platform than at an opposing end of said opposite edges of said platform;

a plurality of first parts of a plurality of two-part attachment systems, each of said side flanges carrying at least one of said first parts;

a plurality of second parts of said two-part attachment systems, at least one of said second parts located on said parallel wall segments; and means capable of mounting at least one of said second parts to said parallel wall segments such that said first parts can engage said second parts so as to secure said mounting plate in a position spanning said space.

13. The apparatus of claim 12, wherein said mounting plate comprises a flexible material.

14. The apparatus of claim 12, wherein said platform comprises fastening means to connect an unit to said platform.

15. The apparatus of claim 12, wherein at least one of said first parts of said two-part attachment systems comprises a selected one of either a hook member or a loop member.

16. The apparatus of claim 15 wherein at least one of said second parts of said two-part attachment systems comprises the nonselected one of either said hook member or said loop member.

17. The apparatus of claim 16, wherein said two-part attachment systems are Velcro.

18. The apparatus of claim 12, wherein said first and said second parts of said two-part attachment systems are located such that engaging said first parts with said second parts positions said mounting plate as a horizontal floor to support an unit on said floor.

19. The apparatus of claim 12, wherein said mounting plate is removable from said receptacle by disengaging said first parts from said second parts.

20. The apparatus of claim 16, wherein said first and said second parts of said two-part attachment systems are located such that engaging said first parts with said second parts positions said support member as a horizontal floor to support an unit located on said floor.

21. The apparatus of claim 16, wherein said mounting plate is removable from said receptacle by disengaging said first parts from said second parts.

22. The apparatus of claim 12, wherein the distance across the space separating the top edges of said opposite planar members is less than the distance across the space separating the bottom edges of said opposite planar members.

* * * * *